United States Patent
Nishioka et al.

(10) Patent No.: US 7,825,786 B2
(45) Date of Patent: Nov. 2, 2010

(54) VEHICLE STATE VALUE DETECTING DEVICE

(75) Inventors: Takashi Nishioka, Wako (JP); Shinichi Uchiyama, Wako (JP); Norio Yamazaki, Wako (JP); Yoshimichi Kawamoto, Wako (JP); Shigenori Takimoto, Wako (JP); Isao Akimoto, Wako (JP); Junichiro Yanagisawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1035 days.

(21) Appl. No.: 11/590,797

(22) Filed: Nov. 1, 2006

(65) Prior Publication Data

US 2007/0198149 A1 Aug. 23, 2007

(30) Foreign Application Priority Data

Feb. 20, 2006 (JP) ............................. 2006-042223

(51) Int. Cl.
*B60Q 1/00* (2006.01)
(52) U.S. Cl. .................. 340/441; 340/438; 701/110
(58) Field of Classification Search .................. 340/438
See application file for complete search history.

(56) References Cited

U.S. PATENT DOCUMENTS

| 7,233,847 | B2* | 6/2007 | Otsuka ................. 701/34 |
| 2005/0222743 | A1* | 10/2005 | Otsuka ................. 701/70 |
| 2006/0287785 | A1* | 12/2006 | DeCarlo et al. ........... 701/29 |

FOREIGN PATENT DOCUMENTS

| JP | 6-278638 A | 10/1994 |
| JP | 7-25257 A | 1/1995 |

* cited by examiner

*Primary Examiner*—George A Bugg
(74) *Attorney, Agent, or Firm*—Arent Fox LLP

(57) ABSTRACT

The vehicle state value detecting device includes a first low pass filter (32, 36) and a second low pass filter (33, 37) having a lower cutoff frequency than the first low pass filter. The device processes a detection signal of a sensor (10, 11) for a motion control of a vehicle such as a yaw rate sensor and a lateral G sensor by selectively using one of the two low pass filters. A signal selecting unit (35, 39) selects the output of the first low pass filter when the control process demands prompt detection of an abrupt changes in the behavior of the vehicle and the output of the second low pass filter when it is not the case and an enhanced stability of the control action has a priority.

9 Claims, 5 Drawing Sheets

VEHICLE STATE VALUE DETECTING DEVICE

TECHNICAL FIELD

The present invention relates to a vehicle state value detecting device suitable for use in the motion control of vehicles that can provide both a high reliability and a high control responsiveness.

BACKGROUND OF THE INVENTION

Efforts are being made in the automotive industry to develop active wheel suspension systems based on the concept of skyhook control. An active suspension system controls the distance between the vehicle body and road surface at a point corresponding to each of the wheels and the damping force of each damper depending on the road condition and the static and dynamic state of the vehicle on a real time basis. Therefore, an active suspension system can provide such advantages as minimization in changes in the attitude of the vehicle, an improved ride quality and prevention of bouncing of wheels, and these also contribute to overall improvements in motion stability and drive/brake performance of the vehicle. An active suspension system requires information on the yaw rate and lateral acceleration of the vehicle for its control action, and obtains such information from corresponding sensors (such as a lateral G sensor and a yaw rate sensor). Such signals are often contaminated with high frequency noises of various origins. It has been therefore customary to use a low pass filter having a certain cutoff frequency to remove high frequency noises from the signal of a lateral G sensor or a yaw rate sensor to ensure a high reliability in controlling the motion of the vehicle. Such examples can be found in Japanese patent laid open publications 07-25257 and 06-278638.

However, such arrangements are known to have a shortcoming because the low pass filter indiscriminately attenuates all the frequency components that are higher than the cutoff frequency in each case. For instance, in a motion control of a road vehicle, when a steering wheel is turned rapidly, the detection signal of the yaw rate sensor or lateral G sensor may change very rapidly. However, because the low pass filter eliminates high frequency components of the sensor signal, such rapid changes in the sensor signal is lost so that the control system is unable to produce a response that would suit such a situation. On the other hand, if a higher cutoff frequency is selected so as to avoid the loss of sudden changes in the detection signal, high frequency noises may not be adequately removed, and a reliability in the control action cannon be achieved.

BRIEF SUMMARY OF THE INVENTION

In view of such problems of the prior art, a primary object of the present invention is to provide a vehicle state value detecting device that is configured to process a detection signal so as to allow a control system that uses the detection signal to operate in a both reliable and responsive manner.

A second object of the present invention is to provide a vehicle state value detecting device that can process a detection signal in an optimum manner by using a highly simple structure.

According to the present invention, such objects can be accomplished by providing a vehicle state value detecting device, comprising: a state value detecting unit for detecting a state variable of a vehicle; a first low pass filter that cuts off a high frequency component from an output signal of the state value detecting unit at a first cutoff frequency; a second low pass filter that is connected in parallel with the first lower pass filter and cuts off a high frequency component from an output signal of the state value detecting unit at a second cutoff frequency lower than the first cutoff frequency; a vehicle condition detecting unit for detecting a first condition and a second condition of the vehicle; and a signal selecting unit for selecting an output signal of the first low pass filter when the first condition is detected and an output signal of the second low pass filter when the second condition is detected.

Therefore, in effect, the vehicle state value detecting device processes a detection signal of a sensor for a motion control of a vehicle such as a yaw rate sensor and a lateral G sensor by selectively using one of the two low pass filters. The signal selecting unit selects the output of the first low pass filter when the control process demands prompt detection of an abrupt changes in the behavior of the vehicle and the output of the second low pass filter when it is not the case and an enhanced stability of the control action has a priority.

The first condition under which prompt detection of abrupt changes in the state variable may be required includes such times as when a steering speed is high, when a stroke speed of a suspension system is higher than a threshold value and when a detected vertical acceleration of a part of a vehicle body is higher than a threshold value.

By properly selecting the output of one of the low pass filters depending on the particular condition of the vehicle, it becomes possible to achieve a high reliability, a high stability and a high responsiveness in a vehicle control at the same time.

Also, when the difference between the outputs of the two low pass filters changes signs by more than a prescribed number of times within a prescribed period, as it means that the detection signal is likely to contain high frequency noises, it would be advantageous to use the output of the second low pass filter and remove the noises for a reliable and stable operation of the system that uses the output of the vehicle state value detecting device.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
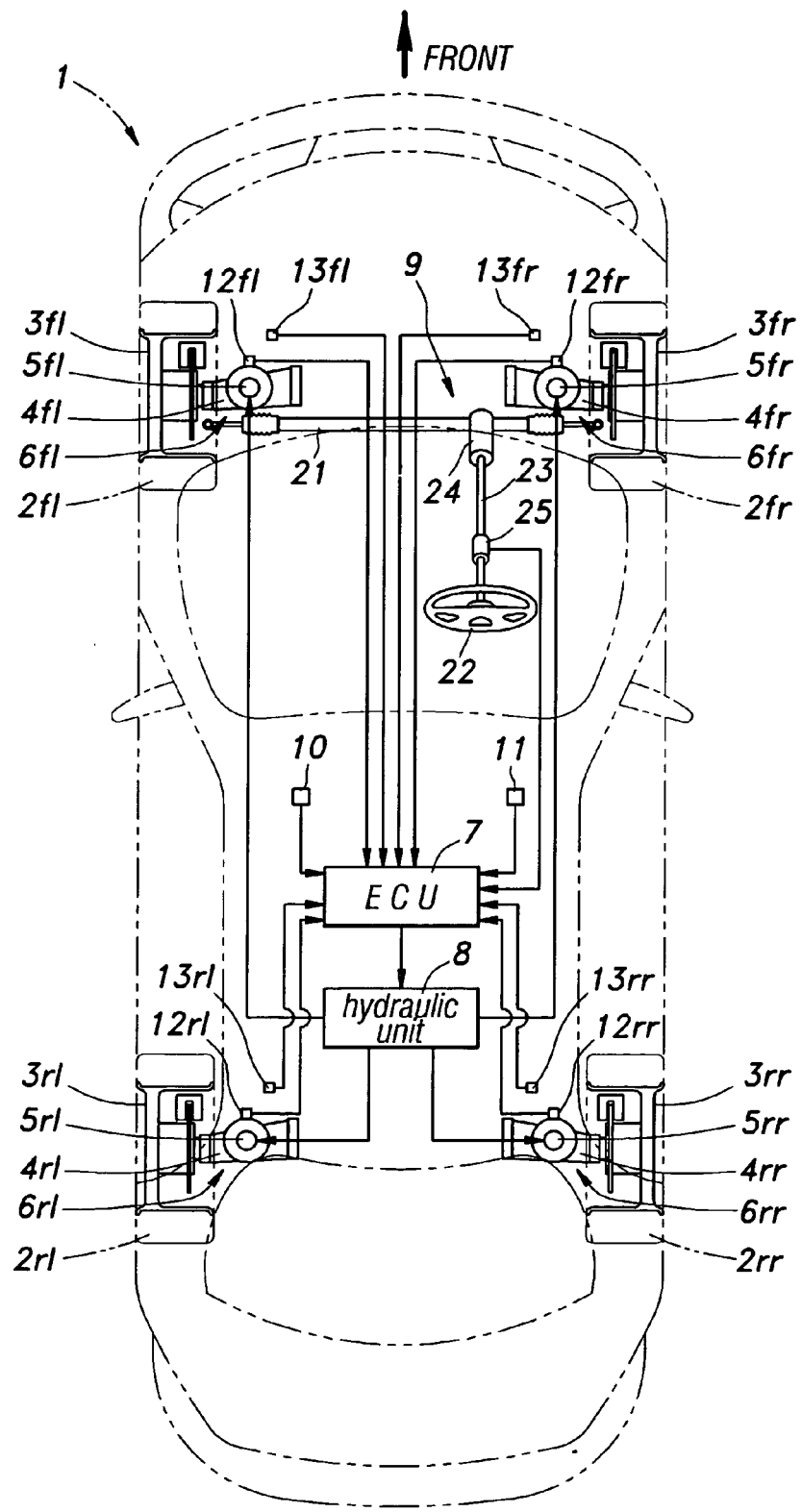
FIG. 1 is a simplified diagram of an automobile to which the present invention is applied.

FIG. 1 is simplified diagram of a vehicle to which the present invention is applied. In FIG. 1, a certain set of components are provided for each of the four wheels of the vehicle, and corresponding components are denoted with like numerals each followed by a suffix that indicates the location of the corresponding wheel, "fl" indicating a front left wheel, "fr" a front right wheel, "rl" a rear left wheel and "rr" a rear right wheel. However, in the following description, such components associated with only one of the wheels are denoted only with the numerals without any suffix and described as representative of the components of the remaining wheels.

Referring to FIG. 1, each wheel 3 of the vehicle 1 is fitted with a pneumatic tire 2, and is supported by a suspension system 6 that includes suspension arms 4 and an actuator 5. The vehicle 1 is centrally equipped with an ECU (electronic control unit) 7 for controlling an active suspension system, a hydraulic unit 8 for feeding and releasing actuating oil to an from each actuator 5 and an EPS (electric power steering system) 9. The vehicle 1 is centrally equipped with a lateral G sensor 10 for detecting a lateral acceleration of the vehicle and a yaw rate sensor 11 for detecting a yaw rate of the vehicle, and a stroke sensor for detecting a vertical displacement of each suspension system and a vertical G sensor 13 for detecting a vertical acceleration of a part of the corresponding wheel house (a part of the vehicle body) for each wheel 3.

The ECU 7 includes a microcomputer, ROM, RAM, peripheral circuits, input/output interfaces and various driver circuits, and is connected to the hydraulic unit 8 and various sensors 10 to 13 via a communication line such a CAN (controller area network). The hydraulic unit 8 includes four individual hydraulic circuits provided with separate electromagnetic valves so that actuating oil may be fed and released from the actuators 5 of the different wheels at different timings and at different pressures.

The ESP 9 includes a steering gear 21 consisting of a rack and pinion gear mechanism not shown in the drawing, a steering shaft 23 having an upper end fitted with a steering wheel 22 and a lower end connected to the steering gear 21 and an EPS motor 24 for providing a steering assist torque to the steering shaft 23. A steering angle sensor 25 is provided on the steering shaft 23 to detect the steering angle of the steering wheel 22, and the output signal of the steering angle sensor 25 is also supplied to the ECU 7.

Figure 2:
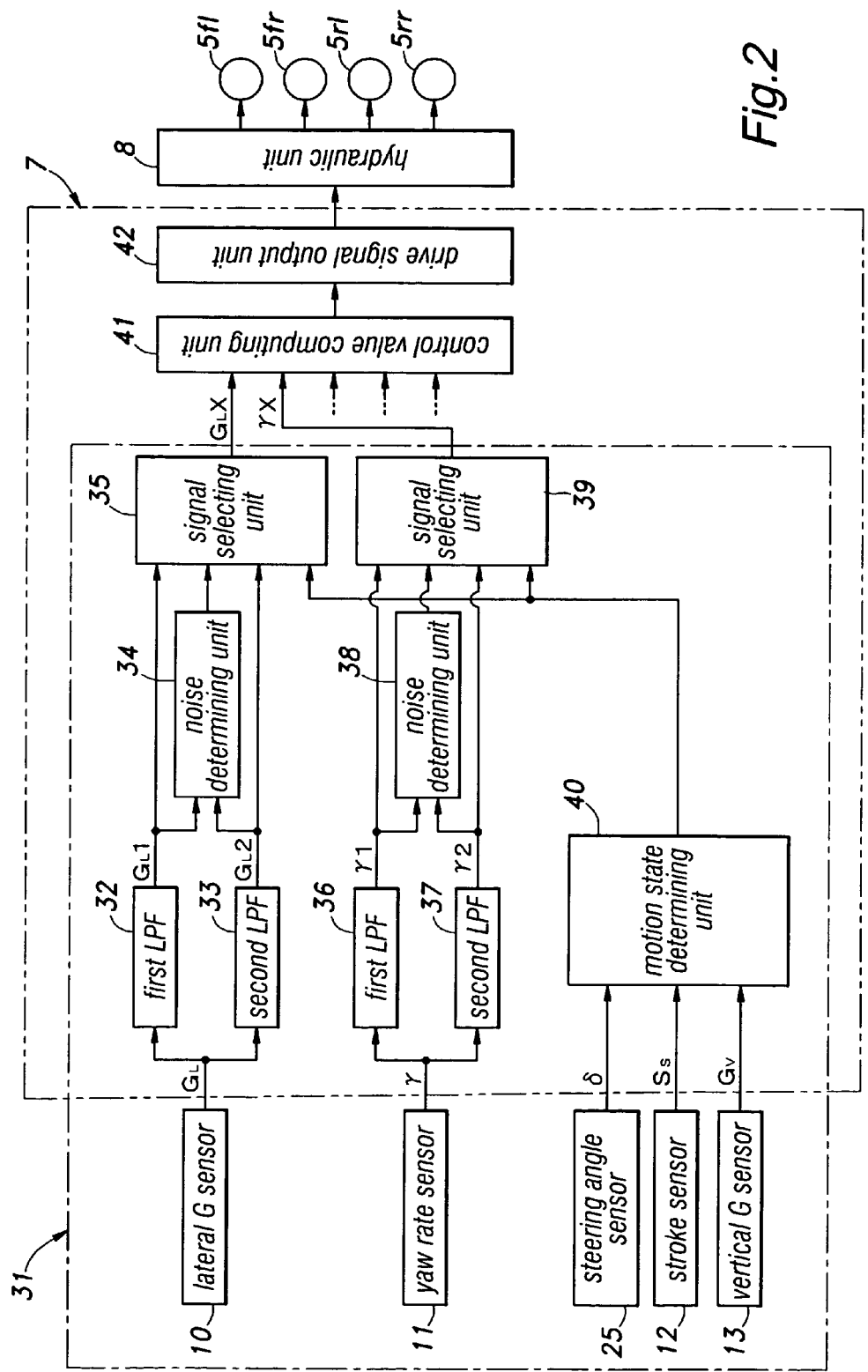
FIG. 2 is a block diagram of a vehicle state value detecting device embodying the present invention.

The ECU 7 forms a vehicle state detecting device 31 in cooperation with the various sensors 10-13 and 25. Referring to FIG. 2, the vehicle state detecting device 31 comprises a first LPF (low pass filter) 32 connected to an output end of the lateral G sensor 10, a second LPF (low pass filter) 33 connected in parallel with the first LPF 3, a noise determining unit 34 connected commonly to the output ends of the first and second LPFs 32 and 33, and a signal selecting unit 35 connected commonly to the output ends of the first and second LPFs 32 and 33 and noise determining unit 34. A first LPF 36, second LPF 37, noise determining unit 38 and a signal selecting unit 39 are similarly connected to the output end of the yaw rate sensor 11. The vehicle state detecting device 31 further comprises a motion state determining unit 40 that receives output signals from the steering angle sensor 25, stroke sensor 12 and vertical G sensor 13 to generate a motion state determining signal and forwards it to the signal selecting units 35 and 36 associated with the lateral G sensor 10 and yaw rate sensor 11, respectively.

The second LPF 33 for the lateral G sensor 10 has a lower cutoff frequency than the corresponding first LPF 32. The second LPF 37 for the yaw rate sensor 11 also has a lower cutoff frequency than the corresponding first LPF 36. A lower cutoff frequency means a higher capability to eliminate high frequency noises from the detected signal under a given condition.

The ECU 7 that forms the vehicle state detecting device 31 also comprises a control value computing unit 41 for controlling a control value for each actuator, a drive signal output unit 42 for providing a drive signal for the hydraulic unit 8 according to the control values computed by the control value computing unit 41 and other computing units and drive control units that are not shown in the drawings.

Figure 3:
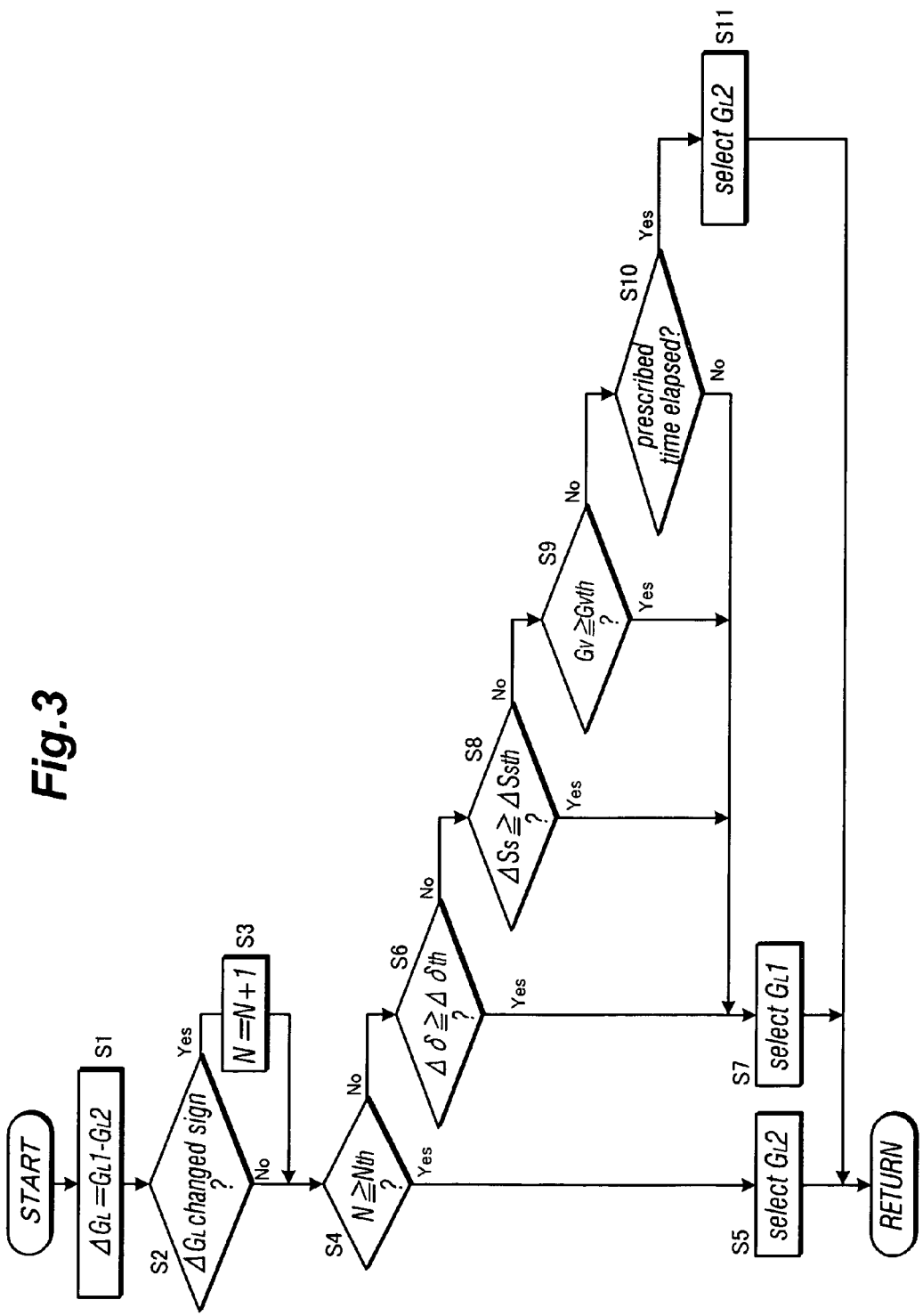
FIG. 3 is a flowchart showing the mode of operation of the vehicle state value detecting device.

The mode of operation of the ECU 7 is now described in the following with reference to the flowchart given in FIG. 3. As the vehicle 1 starts moving, the ECU 7 performs the process of detecting state values of the vehicle outlined in the block diagram of FIG. 2 at a prescribed processing interval (10 msec, for instance). In the illustrated embodiment, the ECU 7 performs the state value detecting process for each of the lateral acceleration and yaw rate, but the control process only for the lateral acceleration is described in the following to simplify the description because the control process for the yaw rate is executed in a similar fashion.

Figure 4:
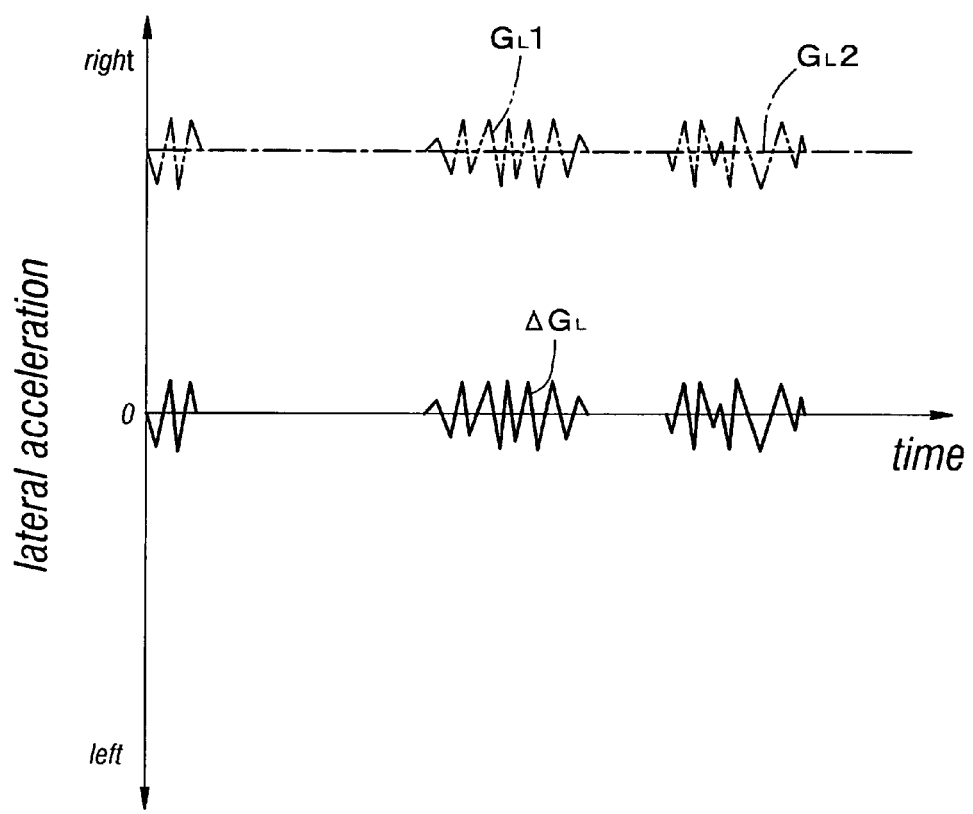
FIG. 4 is a graph showing the waveforms of the first and second detection signals GL1 and GL2 and the difference signal ΔGL.

Upon start of the state value detecting process, the ECU 7 computes a difference $\Delta GL$ between a detection signal GL1 obtained from the first LPF 32 and a detection signal GL2 obtained from the second LPF 33 in step S1, and a reversal in the sign of the $\Delta GL$ is detected in step S2. When a vehicle makes a left turn, for instance, at a fixed steering angle, the output of the lateral G sensor 10 is forwarded to the input ends of both the first LPF 32 and second LPF 33, and corresponding output signals from the first LPF 32 and second LPF 33 are forwarded to the signal selecting unit 35 as detection signals GL1 and GL2, respectively. As shown in FIG. 4, the first detection signal GL1 that is produced from the first LPF 32 contains a more significant amount of high frequency noises than the second detection signal GL2 that is produced from the second LPF 33. By suitably selecting the cutoff frequency, the second detection signal GL2 may be substantially free from high frequency noises. In such a case, the difference $\Delta GL$ consists substantially solely of the high frequency noises that are superimposed on the first detection signal GL1, and rapidly changes signs or fluctuates between positive values and negative values within a short period of time.

If the determination result of step S2 is No, the program flow advances to step S4. If the difference $\Delta GL$ changes signs and the determination result of step S2 becomes Yes, a counter N is incremented by one in step S3 and the program flow advances to step S4. The counter N counts the number by which the difference $\Delta GL$ changes signs within a prescribed time period t1, and is incremented each time the determination result of step S2 becomes Yes. If the determination result continues to be No, the older count that falls out of the time window t1 is deducted from the current count value of the counter N, and the count of the counter diminishes over time.

The noise determining unit 34 determines if the count of the counter N has reached a threshold value Nth in step S4, and if this determination result is Yes, the signal selecting unit 35 selects the detection signal GL2 in step S5 and forwards it to the control value computing unit 41 as a lateral G signal GLX. Thereby, if the detection signal obtained from the first LPF 32 contains an excessive amount of high frequency noises for any reason, the detection signal GL2 obtained from the second LPF 33 having a lower cutoff frequency or the detection signal GL2 which is relatively free from high frequency noises is forwarded to the control value computing unit 41, and this ensures a high reliability in an active suspension control as will be described hereinafter.

If the determination result of step S4 is No, the motion state determining unit 40 determines if a steering speed $\Delta \delta$ obtained from the detection signal $\delta$ of the steering angle sensor 25 is greater than a certain threshold value $\delta th$ in step S6. If the determination result of step S6 is Yes, the signal selecting unit 35 selects the first detection signal GL1 in step S9 and forwards it to the control value computing unit 41 as the lateral G signal GLX. A high-steering speed means a brisk action of the vehicle operator and it is highly likely that the vehicle operator desires a brisk response of the vehicle. Therefore, when the steering speed is high, the first detection signal GL1 containing high frequency components is selected so as to match the brisk action of the vehicle operator.

If the determination result of step S6 is No, the ECU 7 determines if the stroke speed ΔSs of the suspension 6 is greater than a certain threshold valve ΔSsth in step S8. If this determination result is Yes, the signal selecting unit 35 selects the detection signal GL1 in step S7 and forwards it to the control value computing unit 41 as a lateral G signal GLx. Thereby, even when abrupt changes in the detection signal of the lateral G sensor are detected owing to such reasons as the irregularities of the road surface, the active suspension control can be continued with a high control responsiveness.

If the determination result of step S8 is No, the ECU 7 determines if the detection signal Gv of the vertical G sensor 13 is greater than a certain threshold valve Gvth in step S9. If this determination result is Yes, the signal selecting unit 35 selects the detection signal GL1 in step S7 and forwards it to the control value computing unit 41 as a lateral G signal GLx. Thereby, even when abrupt changes in the detection signal of the lateral G sensor are detected owing to vertical vibrations of the vehicle body, the active suspension control can be continued with a high control responsiveness.

If the determination result of step S9 is No, the ECU 7 determines if the current state (the state that the determination result of step S9 is No) has persisted for more than a prescribed time period t2 in step S10. If this determination result is No, the signal selecting unit 35 selects the detection signal GL1 in step S7 and forwards it to the control value computing unit 41 as a lateral G signal-GLx. If this determination result is Yes, the signal selecting unit 35 selects the detection signal GL2 in step S11 and forwards it to the control value computing unit 41 as a lateral G signal GLx. If the lateral G signal GLx were changed from the first detection signal to the second detection signal as soon as the determination result of step S9 has become No immediately after the determination result of step S6, S8 or S9 has become Yes, a control hunting could occur because any subsequent change in the determination result of any of steps S6, S7 and S8 would cause the lateral G signal GLx to be changed from the second detection signal back to the first detection signal.

Figure 5:
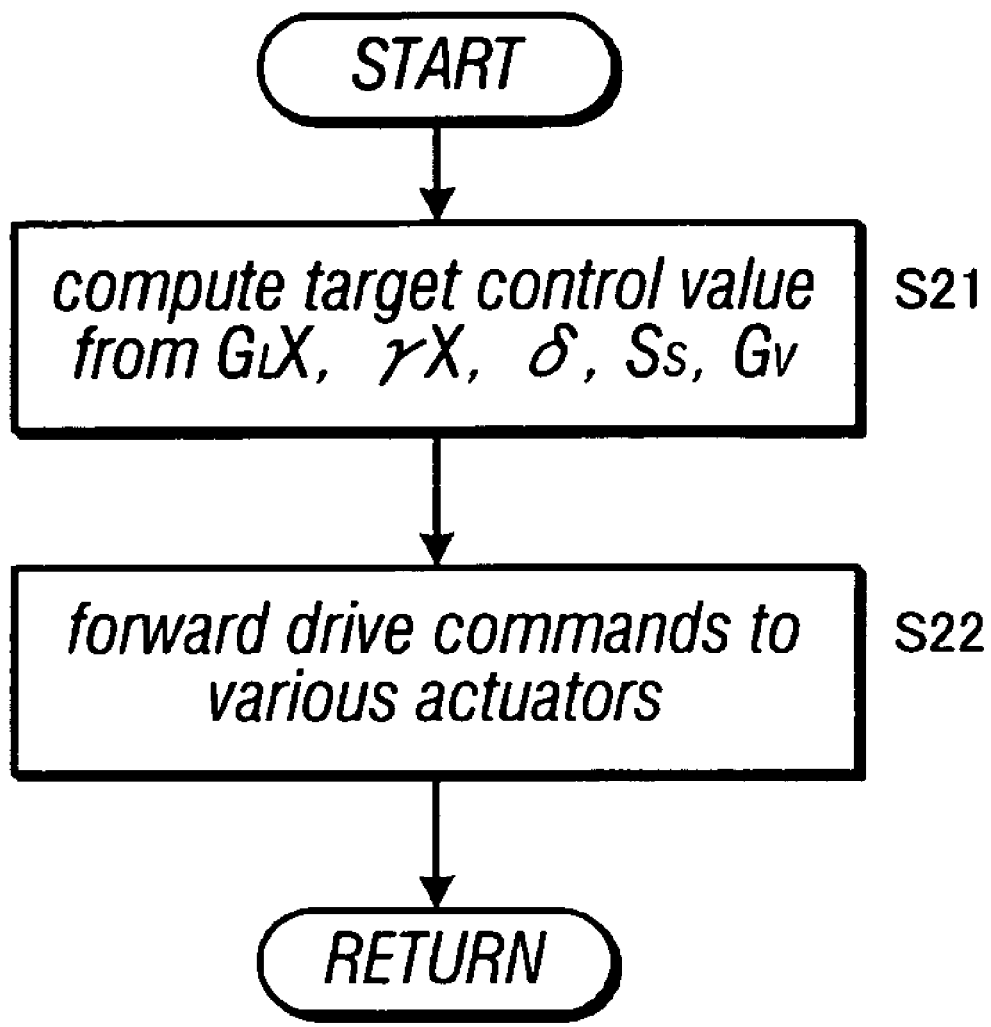
FIG. 5 is a flowchart showing the control process of an active suspension control.

The ECU 7 performs the active suspension control according to the steps given in the flowchart of FIG. 5 at a prescribed processing interval of, for instance, 10 msec). Referring to the flowchart of FIG. 5, the control value computing unit 41 computes the target control value of each actuator 5 according to the lateral G signal GLX obtained from the lateral G signal selecting unit 35, yaw rate signal γX obtained from the yaw rate signal selecting unit 39, steering angle signal δ obtained from the steering angle sensor 25, stroke sensor signal Ss obtained from the stroke sensor 12 and a vertical G signal GV obtained from the vertical G sensor 13. The drive signal output unit 42 generates a drive command for each target control value computed by the control value computing unit 41 and forwards it to the corresponding actuator 5.

Owing to the structure described above, the illustrated embodiment allows the active suspension system to operate in a highly reliable manner even when detection signals contain significant amounts of high frequency noises and in a highly responsive manner even when the state of the vehicle undergoes a sudden change.

Although the present invention has been described in terms of a preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A vehicle state value detecting device, comprising:
   a state value detecting unit for detecting a state variable of a vehicle;
   a first low pass filter that cuts off a high frequency component from an output signal of the state value detecting unit at a first cutoff frequency;
   a second low pass filter that is connected in parallel with the first lower pass filter and cuts off a high frequency component from an output signal of the state value detecting unit at a second cutoff frequency lower than the first cutoff frequency;
   a vehicle condition detecting unit for detecting a first condition and a second condition of the vehicle;
   a signal selecting unit for selecting an output signal of the first low pass filter when the first condition is detected and an output signal of the second low pass filter when the second condition is detected; and
   a noise determining unit that computes a difference between output signals of the first and second low pass filter, the signal selecting unit selecting the output of the second low pass filter when the difference changes signs by more than a prescribed number of times within a prescribed period.

2. The vehicle state value detecting device according to claim 1, wherein the signal selecting unit selects the output of the first low pass filter when the difference do not change signs by more than a prescribed number of times within a prescribed period.

3. A vehicle state value detecting device, comprising:
   a state value detecting unit for detecting a state variable of a vehicle;
   a first low pass filter that cuts off a high frequency component from an output signal of the state value detecting unit at a first cutoff frequency;
   a second low pass filter that is connected in parallel with the first lower pass filter and cuts off a high frequency component from an output signal of the state value detecting unit at a second cutoff frequency lower than the first cutoff frequency;
   a vehicle condition detecting unit for detecting a first condition and a second condition of the vehicle;
   a signal selecting unit for selecting an output signal of the first low pass filter when the first condition is detected and an output signal of the second low pass filter when the second condition is detected; and
   a steering speed detecting unit for detecting a steering speed, the signal selecting unit selecting the output of the first low pass filter when the detected steering speed is higher than a threshold value.

4. The vehicle state value detecting device according to claim 3, wherein the signal selecting unit selects the output of the second low pass filter when the detected steering speed is lower than the threshold value.

5. A vehicle state value detecting device, comprising:
   a state value detecting unit for detecting a state variable of a vehicle;
   a first low pass filter that cuts off a high frequency component from an output signal of the state value detecting unit at a first cutoff frequency;

a second low pass filter that is connected in parallel with the first lower pass filter and cuts off a high frequency component from an output signal of the state value detecting unit at a second cutoff frequency lower than the first cutoff frequency;

a vehicle condition detecting unit for detecting a first condition and a second condition of the vehicle;

a signal selecting unit for selecting an output signal of the first low pass filter when the first condition is detected and an output signal of the second low pass filter when the second condition is detected; and a steering speed detecting unit for detecting a steering speed and a noise determining unit that computes a difference between output signals of the first and second low pass filter, the signal selecting unit selecting the output of the second low pass filter when the detected steering speed is lower than a threshold value or when the difference changes signs by more than a prescribed number of times within a prescribed period.

6. A vehicle state value detecting device, comprising:

a state value detecting unit for detecting a state variable of a vehicle;

a first low pass filter that cuts off a high frequency component from an output signal of the state value detecting unit at a first cutoff frequency;

a second low pass filter that is connected in parallel with the first lower pass filter and cuts off a high frequency component from an output signal of the state value detecting unit at a second cutoff frequency lower than the first cutoff frequency;

a vehicle condition detecting unit for detecting a first condition and a second condition of the vehicle;

a signal selecting unit for selecting an output signal of the first low pass filter when the first condition is detected and an output signal of the second low pass filter when the second condition is detected; and a stroke sensor for detecting a stroke speed of a suspension system, the signal selecting unit selecting the output of the first low pass filter when the detected stroke speed is higher than a threshold value.

7. The vehicle state value detecting device according to claim 6, wherein the signal selecting unit selects the output of the second low pass filter when the detected stroke speed is lower than the threshold value.

8. A vehicle state value detecting device, comprising:

a state value detecting unit for detecting a state variable of a vehicle;

a first low pass filter that cuts off a high frequency component from an output signal of the state value detecting unit at a first cutoff frequency;

a second low pass filter that is connected in parallel with the first lower pass filter and cuts off a high frequency component from an output signal of the state value detecting unit at a second cutoff frequency lower than the first cutoff frequency;

a vehicle condition detecting unit for detecting a first condition and a second condition of the vehicle;

a signal selecting unit for selecting an output signal of the first low pass filter when the first condition is detected and an output signal of the second low pass filter when the second condition is detected; and a vertical G sensor for detecting a vertical acceleration of a vehicle body, the signal selecting unit selecting the output of the first low pass filter when the detected vertical acceleration is higher than a threshold value.

9. The vehicle state value detecting device according to claim 8, wherein the signal selecting unit selects the output of the second low pass filter when the detected vertical acceleration is lower than the threshold value.

* * * * *